(12) United States Patent
Keithley

(10) Patent No.: US 9,041,988 B1
(45) Date of Patent: *May 26, 2015

(54) EXPOSURE CORRECTION FOR SCANNERS

(71) Applicant: Marvell International Ltd., Hamilton (BM)

(72) Inventor: Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,224

(22) Filed: Nov. 1, 2013

Related U.S. Application Data

(63) Continuation of application No. 13/718,205, filed on Dec. 18, 2012, now Pat. No. 8,599,453, which is a continuation of application No. 11/823,588, filed on Jun. 28, 2007, now Pat. No. 8,339,689.

(60) Provisional application No. 60/818,078, filed on Jun. 30, 2006.

(51) Int. Cl.
*H04N 1/46* (2006.01)
*H04N 1/00* (2006.01)

(52) U.S. Cl.
CPC ....... *H04N 1/00087* (2013.01); *H04N 1/00005* (2013.01)

(58) Field of Classification Search
None
See application file for complete search history.

(56) References Cited

U.S. PATENT DOCUMENTS

| | | | |
|---|---|---|---|
| 4,174,528 A | 11/1979 | White | |
| 4,980,759 A * | 12/1990 | Smyth | 358/500 |
| 4,999,801 A * | 3/1991 | Katsuno | 708/500 |
| 5,019,786 A | 5/1991 | Fairley et al. | |
| 5,631,920 A | 5/1997 | Hardin | |
| 6,037,584 A * | 3/2000 | Johnson et al. | 250/235 |
| 6,571,189 B2 * | 5/2003 | Jensen et al. | 702/104 |
| 7,079,616 B2 * | 7/2006 | Castiglione et al. | 375/376 |

* cited by examiner

*Primary Examiner* — Paul F Payer

(57) ABSTRACT

A method and apparatus for exposure correction in scanners are disclosed. In the method, exposure is corrected for pixels received in an image sensor array. Exposure time is tracked for the incoming pixel data and a calibration factor is determined for correcting the gain, and the calibration factor is adjusted based on the tracked exposure time. In the apparatus, a scanner includes an illumination source and a sensor for receiving pixel data. Using values stored in a memory, circuitry is provided for determining a calibration factor, for tracking exposure time for the pixel data and for adjusting the pixel data based on the calibration factor and exposure time.

20 Claims, 4 Drawing Sheets

EXPOSURE CORRECTION FOR SCANNERS

RELATED APPLICATIONS

This application is a continuation application of U.S. patent application Ser. No. 13/718,205, filed Dec. 18, 2012, which is a continuation application of U.S. patent application Ser. No. 11/823,588 (now U.S. Pat. No. 8,339,689), filed Jun. 28, 2007, which claims the benefit of U.S. Provisional Patent Application No. 60/818,078, entitled EXPOSURE CORRECTION FOR SCANNERS, filed on Jun. 30, 2006, the entirety of each is hereby incorporated by reference in their entirety.

BACKGROUND

The present invention relates to imaging. In particular, the present invention relates to exposure correction in imaging devices, such as scanners of various types.

Scanners are used to receive and process an image from media into an electronic file format. High-precision scanners typically use a stepper motor to drive the media relative to the scanning sensor, or to drive the sensor relative to the media. Stepper motors have the benefit of precise motion, but are expensive and generally bulky. As consumers continue to demand a decrease in the size and cost of scanners, manufacturers have substituted higher-torque DC motors. The motion of the DC motors can be irregular, and such irregular motion results in inconsistent or non-uniform exposure of the media to the scanner light source.

Newer scanning devices utilize LEDs to illuminate the media for the scanning process. Because of their fast switchability, LEDs allow for a wide range of exposure adjustment possibilities through the use of feedback loops in the scanning circuitry. These scanning devices can turn the LEDs on and off to adjust for irregularities in the appropriate amount of exposure to a sensor array.

Many scanners utilize the uniform light offered by a cold cathode fluorescent lamp (CCFL) assembly. These lamps do not have rapid switchability. In order for the exposure under such lamps to be consistent, the amount of time that the media is exposed must be the same for all of the scan lines that are captured. Without the use of an accurate stepper motor, the varying motor speed will result in streaks on the scanned image due to non-uniform exposure of each scan line.

BRIEF SUMMARY

The present invention utilizes circuitry to measure the exposure time of an incoming set of pixel data, typically for a line of scanned pixels. Using this measured exposure time, a reciprocal value is calculated and used to adjust the amplitude of the incoming pixel data to ensure that the lines of pixels appear consistent throughout the scanned image. The logic may be implemented in separate hardware or in a simple 16-bit counter that is used to adjust the scanned pixel data at the same time that the scanner circuitry adjusts the gain and offset for the same pixel data.

In one aspect of the present invention, a method is provided for correcting exposure in a scanner. In the method, exposure time is tracked for the incoming pixel data read by an image sensor array. A calibration factor is then determined for correcting the gain, and the calibration factor is adjusted based on the tracked exposure time.

In another aspect of the present invention, an apparatus is provided for correcting exposure in a scanner having an illumination source and a sensor for receiving pixel data. Using values stored in a memory, circuitry is provided for determining a calibration factor, tracking exposure time for the pixel data, and adjusting the pixel data based on the calibration factor and the exposure time. The circuitry may also correct an offset for the pixel data.

In yet another aspect of the present invention, an apparatus is provided for correcting exposure in a scanner having an illumination means and a sensor means. Using values stored in a memory means, a circuitry means is provided for determining a calibration factor, tracking exposure time for the pixel data, and adjusting the pixel data based on the calibration factor and the exposure time. The circuitry means may also correct an offset for the pixel data.

BRIEF DESCRIPTION OF THE DRAWINGS

The accompanying drawings, which are incorporated in and form a part of the specification, illustrate the embodiments of the present invention and, together with the description serve to explain the principles of the invention.

DETAILED DESCRIPTION OF THE DRAWINGS AND THE PRESENTLY PREFERRED EMBODIMENTS

Figure 1:
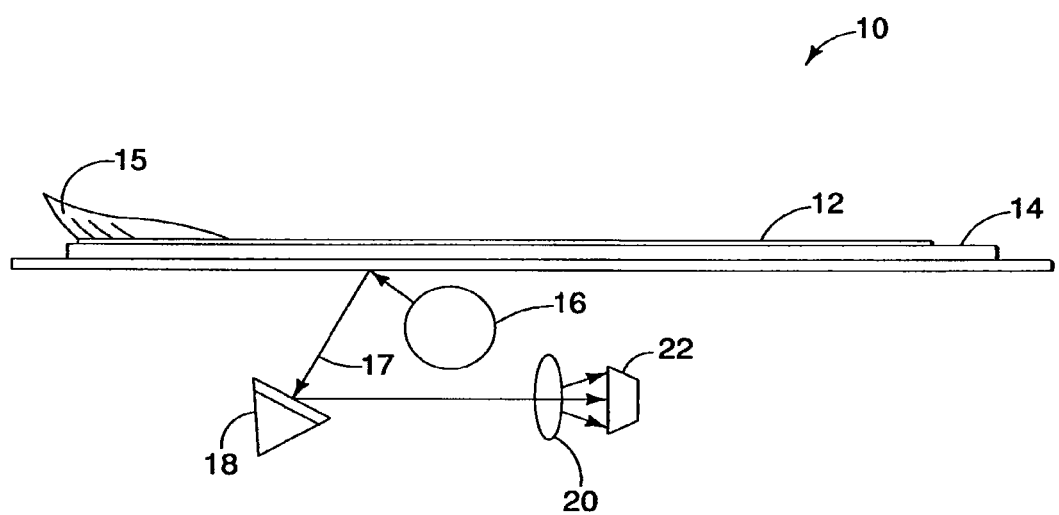
FIG. 1 is a schematic diagram of an exemplary flatbed scanner of the prior art.

In describing the preferred embodiments of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 2:
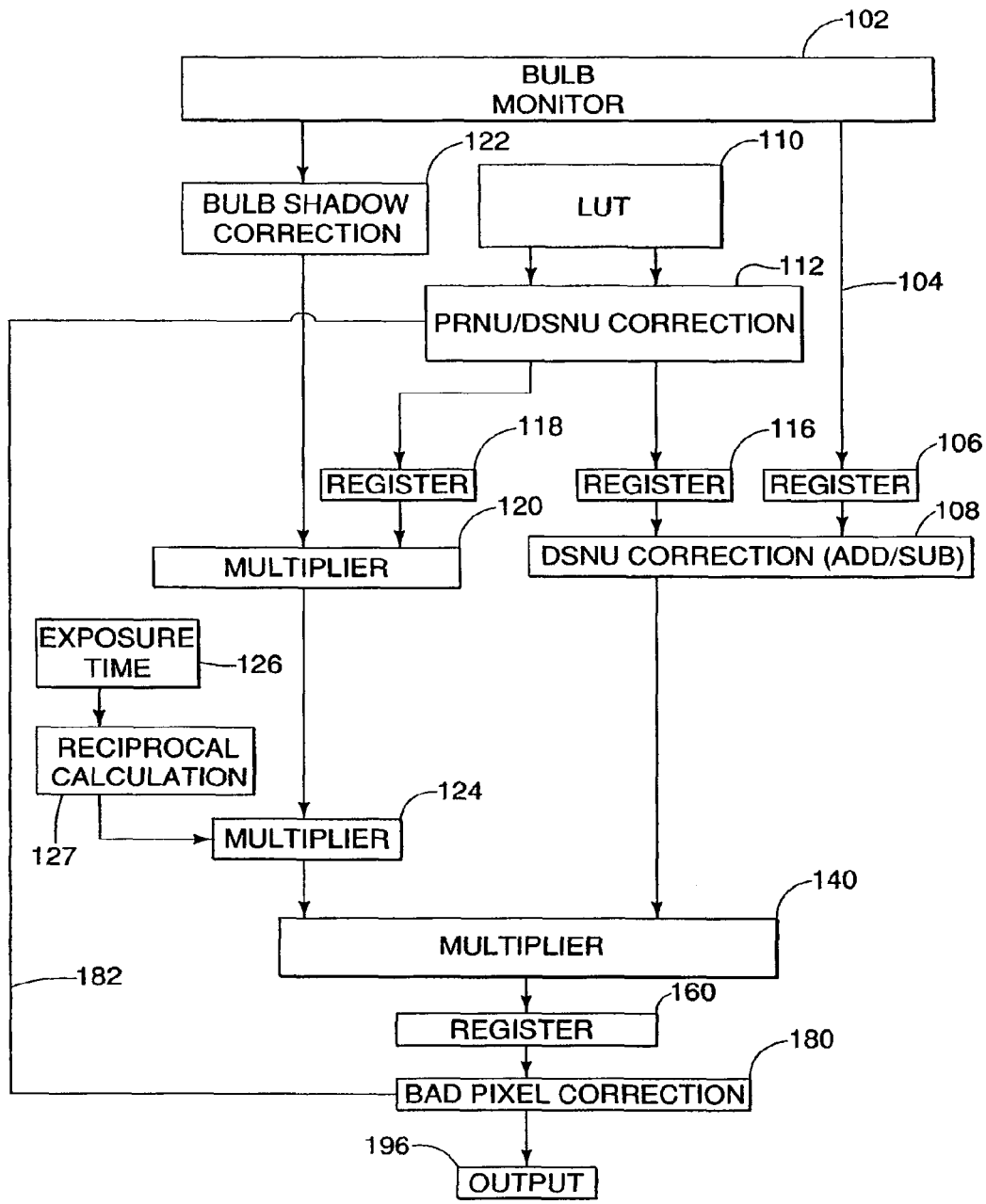
FIG. 2 is a block diagram illustrating an exemplary implementation of an exposure adjustment apparatus in accordance with a first embodiment of the present invention.
Figure 4:
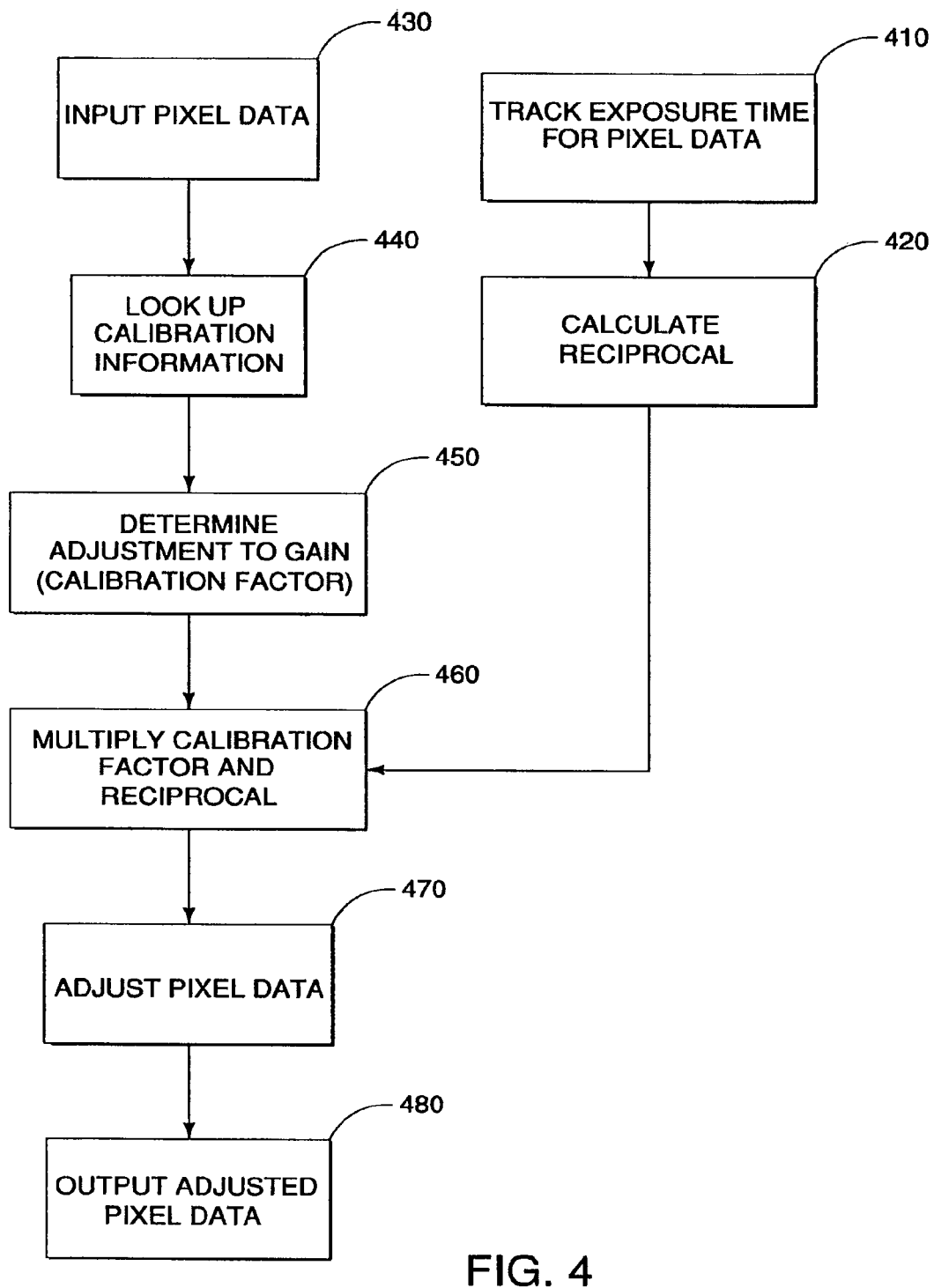
FIG. 4 is a flow diagram illustrating a method in accordance with a second embodiment of the present invention.

With reference to the drawings, in general, and to FIGS. 2 and 4 in particular, the method and apparatus of the present invention are disclosed.

FIG. 1 shows a schematic diagram of a flatbed scanner device 10 of the prior art used in combination with embodiments of the invention disclosed herein. The scanner can be of any other type, including a sheet-fed scanner, a drum scanner or a handheld scanner. In the scanner device 10, a media 12 is placed on a platen glass 14. An image 15 on the media 12 is facing downwardly towards an illumination source 16 positioned on the opposite side of the platen glass 14. The illumination source 16 may cast light on the media 12, and an illuminated view 17 of the image 15 may be reflected by one or more mirrors 18 to one or more lens elements 20. The lens elements 20 may focus the image for sensing by an image sensor array 22.

In most consumer flatbed scanners, the image sensor array 22 is a line sensor array that is able to sense a line of pixels at once. Other sensor configurations may be utilized with embodiments of the present invention.

FIG. 2 is a simplified block diagram illustrating hardware components of a first embodiment of the present invention. As shown in FIG. 2, a bulb monitor 102 receives pixel data from the image sensor array 22 of FIG. 1. Conventional pixel data adjustment is then performed using the circuitry of FIG. 2 to determine adjustment factors for the gain and offset for the pixel data. In order to normalize the pixel data in light of calibration values, the pixel data is first sent to memory registers 106 and 108 which hold the data for processing for offset correction and for gain calibration, respectively. Any necessary DSNU offset correction is made in the DSNU correction logic (or circuitry) 108 after receiving calibration information from a look-up table stored in the memory 110. Inquiries to the memory 110 are controlled by the Photo Response Non-Uniformity/Dark Signal Non-Uniformity (PRNU/DSNU) correction block 112. The DSNU offset data are stored in the memory register 116. The DSNU correction logic 108 subtracts the DSNU offset from the incoming pixel data and sends the DSNU-corrected pixel data to the multiplier 140.

Similar to the offset adjustments, adjustments to the gain or amplitude are made based on values stored in the memory 110 as controlled by the PRNU/DSNU correction block 112. The PRNU gain data as retrieved from the memory 110 are held in the register 118. Bulb shadow correction, if any, is determined at the block 122 for pixels at the outer edges of the bulb lighting area and fed in combination with the gain calibration information to the multiplier 120. The multiplier 120 determines a gain calibration factor based on the bulb shadow information and the stored PRNU gain data in the memory 110. The gain calibration factor is a correction factor used to adjust the gain for the pixel data.

Data is received at a fixed data rate through the bulb monitor 102. The bulb monitor 102 monitors the bulb circuitry to ensure that the lamp is properly illuminated and is thus able to produce accurate, valid pixel data. As pixel data is received, a 16-bit counter 126 measures the corresponding exposure time for a line of pixel data and stops its measurement as the scanner resets for the next line of pixel data. The exposure time is the amount of time that the pixels are exposed to the light source or, in other words, the amount of time that the incoming pixel data for a line is received into the bulb monitor 102. The exposure time from the counter 126 is input into the block 127 for calculation of a reciprocal of the exposure time value. The output of the block 127 is an exposure correction factor that is fed to the multiplier 124.

Because the amplitude of the pixel data and the exposure time has a reciprocal relationship, an amount of overexposure can be corrected by multiplying the amplitude by the reciprocal of that time. This adjustment reduces the overexposure to nominal. Likewise, underexposure may be corrected by multiplying the amplitude by the reciprocal of the amount of underexposure. To make this exposure adjustment, the reciprocal of the exposure time is multiplied with the gain calibration factor in the multiplier 124, producing a pixel correction factor. Thus, the amplitude of the pixels eventually is corrected by making this further correction to the gain calibration factor.

The pixel correction factor is output to the multiplier 140, which receives and combines the pixel correction factor (which includes the gain calibration factor) from the multiplier 124 with the offset-corrected pixel data from the DSNU correction logic 108. The corrected data is stored in the register 160. If bad pixels are noted in the initial processing, they are further corrected by the logic 180 and sent to the output register 196.

It should be noted that various logic and memory components are not shown in the diagram of FIG. 2 for purposes of clarity. Such components may comprise additional banks of registers in communication with some of the logic components to operate as part of a timing pipeline to store data at various points for the logic components.

Preferably, the pixel correction functions and the exposure compensation functions are mutually exclusive in terms of active operation. Once the exposure compensation calculations are in operation, then the pixel correction functions on the incoming data are in passive mode. Thus, until exposure compensation functions are completed by the reciprocal calculation output from the block 127 for a previous line of pixel data, new pixel data will not be received into the DSNU correction logic 108 and the multiplier 120.

The present embodiment does not add significantly to the logic already implemented for pixel data processing and enhancement on most scanning devices. Indeed, a bit need only be set on the present hardware processor to count the exposure time and input the count into one or more registers for use by the multiplier 124. Because the corresponding exposure time reciprocal is implemented to adjust the existing gain calibration factor, further multiplying or multiplexing hardware is not needed to adjust the exposure of the data. All of the logic or circuitry components herein may be run on a dithered clock.

Figure 3:
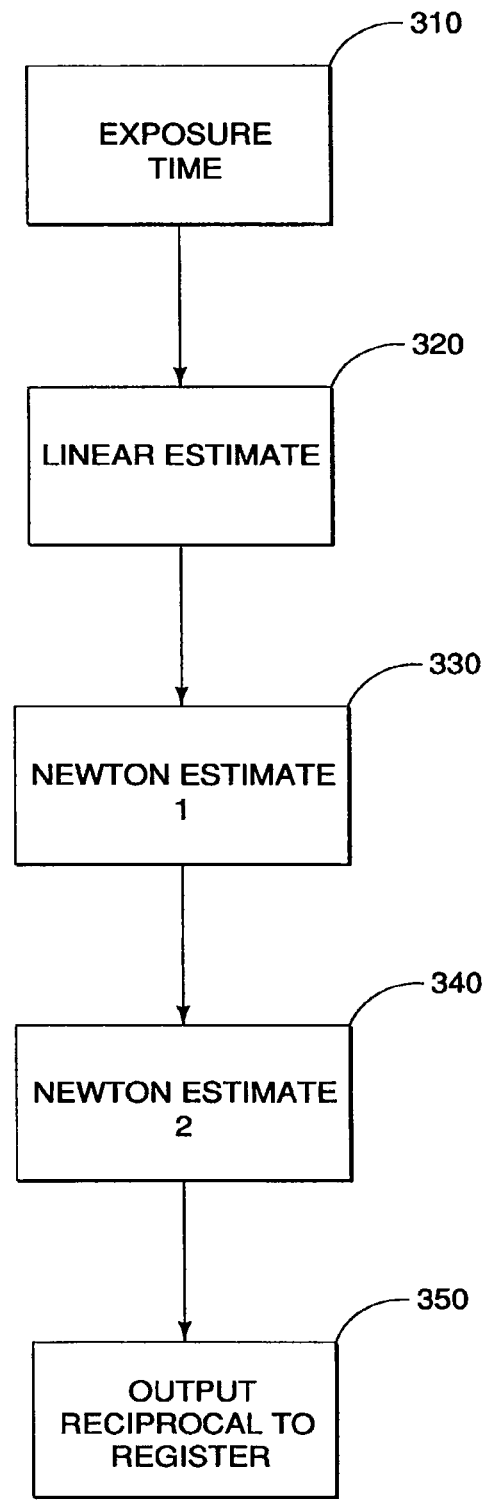
FIG. 3 is a flow diagram illustrating a method of calculating a reciprocal value as implemented in the embodiments of the invention.

A hardware divider (not shown) may also be used to facilitate the calculation of the reciprocal based on the exposure time. In some applications, or to save material cost for extra hardware components, it may be desirable to calculate the reciprocal of the exposure time for use in the embodiment of FIG. 2 without the use of a hardware divider. FIG. 3 illustrates an exemplary method of calculating the reciprocal of the exposure time without the need for using a hardware divider. In this alternative method that may be carried out by logic in the block 127 of FIG. 2, the present logic estimates the reciprocal by performing multiple iterations of a Newtonian approximation of the reciprocal.

As shown in FIG. 3, the exposure time input is received at 310 from the counter 126, and a linear estimate of the reciprocal is taken at 320 by conventional means, for example through a determination of the proximity of the exposure time to a nominal exposure time ratio of 1. A first Newtonian estimate is taken at 330 to produce a first approximation of the reciprocal. To provide more convergence toward a true reciprocal value, a second Newtonian estimate is taken at 340. The final reciprocal estimation is then output to a register (not shown) for input into the multiplier 124 in FIG. 2.

While two separate iterations of the Newtonian estimates are shown in FIG. 3, more iterations may be used for improved accuracy if desired. In the alternative, a memory containing a look-up table of applicable reciprocal values corresponding to various exposure time values may be implemented instead of the above logic. Other methods of calculation may also be used.

Referring now to FIG. 4, in combination with the previous Figures, a flow diagram is shown illustrating a method of performing exposure compensation in accordance with a second embodiment of the present invention. As shown in FIG. 4, pixel data is received at 430 from the image sensor array 22 from FIG. 1. Exposure time is tracked simultaneously at 410, and a reciprocal is calculated at 420 by the block 127 of FIG. 2 to determine an exposure correction factor. Calibration information from the pixel data is processed in accordance with calibration standards in the memory 110 at 440. At 443, an offset adjustment is determined by the PRNU/DSNU correction block 112 from data in the memory 110 of FIG. 2. The PRNU/DSNU correction block 112 receives data from the memory 110 and determines the DNSU offset data to deposit into register 116 and the PRNU gain data for deposit into register 118. At 446 the offset is subtracted from the input pixel data. This offset correction step at 446 is performed by the DSNU correction logic 108 in FIG. 2. An adjustment to the gain (the gain calibration factor) is then determined at 450 by the multiplier 120 of FIG. 2.

The reciprocal of the exposure time is multiplied with the gain calibration factor at 460, thereby producing a pixel correction factor output from the multiplier 124 of FIG. 2. Using the pixel correction factor, the offset-corrected pixel data is adjusted at 470 in the multiplier 140 of FIG. 2. The final adjusted pixel data is output at 480.

The present method results in scanned images that display a consistent exposure as adjusted on a line-by-line basis. In cases where the current line's exposure is not yet obtained, an approximation of an exposure value for the current pixel data line may be made by utilizing an exposure reciprocal from one or more preceding processed lines. The method and apparatus herein may of course be implemented in various forms of hardware and also in software, and other processes on the image, such as pixel enhancement, resolution enhancement or de-noising functions may be implemented to run simultaneously with the embodiments herein.

It should be noted that a non-dithered system clock signal can be used to regulate the logic herein to improve performance and speed for high-speed scanner implementations. As a further alternative, the present invention may also be implemented in non-constant LED-illuminated scanner systems wherein the exposure time may be measured as LED "on" time as opposed to the line exposure time.

To compensate for variations in system clock frequency, the measurement can be changed from pixels or system clocks to a reference clock that is not dithered. For LED illumination the measurement could be of the LED exposure time, rather than the line exposure time since the illumination is not constant. If the variations in LED illumination exposure time due to system clocks are desired to be reduced, rather than correct with the above described measurement method, the exposure could be controlled from a non-dithered clock source.

It is therefore intended that the foregoing detailed description be regarded as illustrative rather than limiting, and that it be understood that it is the following claims, including all equivalents, that are intended to define the spirit and scope of this invention.

What is claimed is:

1. A controller for correcting for inconsistencies in a scanner, the controller comprising:
   an interface with a sensor, the sensor configured to sense an image exposed by an illumination source for a duration of an exposure time;
   wherein the controller is configured to:
      receive pixel data generated based on the image sensed by the sensor;
      measure the duration of the exposure time according to a non-dithered reference clock that is different from a dithered system clock;
      determine an exposure correction factor based on the measured exposure time; and
      compensate for inconsistencies in the pixel data according to the exposure correction factor,
   wherein the controller is configured to be timed using a system clock signal from the dithered system clock that is different from the reference clock.

2. The controller of claim 1, wherein the controller is configured to determine the exposure correction factor by calculating a reciprocal of the measured exposure time.

3. The controller of claim 2, wherein the controller is configured to calculate the reciprocal based on a Newtonian approximation.

4. The controller of claim 1, wherein the controller is further configured to:
   access calibration values that are stored on a memory;
   determine a calibration factor based on the calibration values; and
   adjust the pixel data based on the calibration factor.

5. The controller of claim 4, wherein the controller is configured to determine a pixel correction factor by multiplying the exposure correction factor by the calibration factor.

6. The controller of claim 4, wherein the controller is configured to adjust the pixel data by multiplying the pixel data by a pixel correction factor.

7. The controller of claim 4, wherein the controller is further configured to apply the calibration factor for correcting a gain of the pixel data.

8. The controller of claim 1, wherein the controller is further configured to correct an offset for the pixel data.

9. The controller of claim 1, wherein the controller is configured to measure the exposure time while the image is exposed by the illumination source and while the sensor is generating pixel data for the image.

10. The controller of claim 1, wherein the controller is configured to measure the exposure time as a duration during which the pixel data is generated.

11. A method of correcting exposure in a scanner, the method comprising:
   receiving pixel data from a sensor array generated based on an image exposed by an illumination source for a duration of an exposure time;
   measuring the exposure time for the pixel data based on a non-dithered reference clock that is different from a dithered system clock;
   determining an exposure correction factor based on the measured exposure time; and
   according to the exposure correction factor, compensating for inconsistencies in the pixel data,
   wherein a controller is configured to be timed using a system clock signal from the dithered system clock that is different from a signal from the reference clock.

12. The method of claim 11, wherein determining the exposure correction factor comprises calculating a reciprocal of the measured exposure time.

13. The method of claim 12, further comprising:
   accessing calibration values that are stored on a memory;
   determining a calibration factor based on the calibration values; and
   adjusting the pixel data based on the calibration factor.

14. The method of claim 13, further comprising:
   determining a pixel correction factor by multiplying the calibration factor by the exposure correction factor.

15. The method of claim 14, wherein determining the pixel correction factor further comprises multiplying the calibration factor by a reciprocal of the measured exposure time.

16. The method of claim 14, further comprising adjusting the pixel data based on the pixel correction factor.

17. The method of claim 16, wherein adjusting the pixel data further comprises multiplying the pixel data by the pixel correction factor.

18. The method of claim 11, wherein the calibration factor is determined on a line by line basis with respect to the image.

19. The method of claim 11, further comprising applying the calibration factor for correcting a gain of the pixel data.

20. An apparatus configured to correct for inconsistencies in a scanner, the apparatus comprising:
   a controller, the controller configured to:
      control a counter to measure an exposure time for at least one sensor based on a reference clock that is not dithered, wherein the at least one sensor is configured to sense an image illuminated by an illumination source, and send pixel data of the image;

receive the pixel data;

measure the duration of the exposure time according to a non-dithered reference clock that is different from a dithered system clock;

determine an exposure correction factor based on the measured exposure time; and compensate for inconsistencies in the pixel data according to the exposure correction factor, wherein the controller is configured to be timed using a system clock signal from the dithered system clock that is different from the reference clock.

* * * * *